(12) United States Patent
Patton

(10) Patent No.: US 10,138,625 B2
(45) Date of Patent: Nov. 27, 2018

(54) WATER RUNOFF TREATMENT APPARATUS

(71) Applicant: Edward Patton, Pittsburgh, PA (US)

(72) Inventor: Edward Patton, Pittsburgh, PA (US)

( * ) Notice: Subject to any disclaimer, the term of this patent is extended or adjusted under 35 U.S.C. 154(b) by 220 days.

(21) Appl. No.: 14/979,895

(22) Filed: Dec. 28, 2015

(65) Prior Publication Data

US 2017/0183242 A1    Jun. 29, 2017

(51) Int. Cl.
| | |
|---|---|
| *B01D 71/00* | (2006.01) |
| *E03F 1/00* | (2006.01) |
| *C02F 3/32* | (2006.01) |
| *C02F 1/44* | (2006.01) |
| *B01D 71/26* | (2006.01) |
| *C02F 1/00* | (2006.01) |
| *C02F 103/00* | (2006.01) |
| *C02F 1/40* | (2006.01) |

(52) U.S. Cl.
CPC .............. *E03F 1/002* (2013.01); *B01D 71/26* (2013.01); *C02F 1/004* (2013.01); *C02F 1/44* (2013.01); *C02F 3/327* (2013.01); *B01D 2201/287* (2013.01); *B01D 2201/64* (2013.01); *C02F 1/40* (2013.01); *C02F 2103/001* (2013.01); *Y02W 10/18* (2015.05)

(58) Field of Classification Search
CPC . E03F 1/002; E03F 1/005; E03F 1/003; E03F 5/0404; E03F 5/101; E03F 5/106; E03F 5/16; C02F 1/001; C02F 2103/001; C02F 1/44; C02F 3/327; C02F 9/00; C02F 2103/801; B01D 24/24; B01D 33/01; B01D 33/808; B01D 37/045; B01D 61/58; B01D 67/002; B01D 69/02; B01D 71/021; B01D 71/26; B01D 1061/58; B01D 1067/002
USPC ............. 210/170.03, 602; 405/36, 43; 404/4
See application file for complete search history.

(56) References Cited

U.S. PATENT DOCUMENTS

| | | | |
|---|---|---|---|
| 4,720,209 A | 1/1988 | Iams | |
| 4,923,330 A | 5/1990 | DeTommaso | |
| 5,511,904 A | 4/1996 | Van Egmond | |
| 6,126,817 A | 10/2000 | Duran et al. | |
| 6,277,274 B1 * | 8/2001 | Coffman ............... | B01D 24/205 210/150 |

(Continued)

OTHER PUBLICATIONS

Torrent Resources; MaxWell IV Drainage System.

(Continued)

*Primary Examiner* — Claire A Norris
(74) *Attorney, Agent, or Firm* — AP Patents

(57) ABSTRACT

A water treatment apparatus includes a membrane in a contact with a soil structure, a hollow elongated member being passed through membrane and being mounted vertically within a vertical well with the bottom end of the elongated member being configured to expel treated water into the soil structure, a filtration member mounted stationary or for a linear reciprocal movement so as to filter the water prior to entry into a hollow interior of the elongated member, a trash rack positioned on the membrane and surrounding an upper portion of the elongated member and a barrier positioned adjacent and/or on said peripheral side wall of said trash rack, said barrier configured to reduce flow of the water and/or absorb a portion of the contaminant(s) prior to the water entering said filtration member.

20 Claims, 13 Drawing Sheets

(56) References Cited

U.S. PATENT DOCUMENTS

| | | | |
|---|---|---|---|
| 7,780,855 B2 | 8/2010 | Eberly | |
| 8,110,105 B2 | 2/2012 | Allen, II et al. | |
| 8,333,885 B1* | 12/2012 | Iorio | C02F 3/327 |
| | | | 210/150 |
| 8,557,109 B1* | 10/2013 | Sutherland | E03F 5/0409 |
| | | | 210/163 |
| 2012/0195686 A1 | 8/2012 | Hardgrave | |
| 2012/0292235 A1* | 11/2012 | Fink | E03F 5/0404 |
| | | | 210/90 |
| 2013/0175216 A1* | 7/2013 | Ma | C02F 3/046 |
| | | | 210/602 |

OTHER PUBLICATIONS

Wikipedia, Bioretention, https://en.wikipedia.org/wiki/Bioretention.

Jia Liu, David J. Sample, Cameron Bell and Yuntao Guan, Review and Research Needs of Bioretetion used for the Treatment of Urban Stormwater, Water ISSN 2073-4441, Published Apr. 24, 2014.

* cited by examiner

WATER RUNOFF TREATMENT APPARATUS

CROSS-REFERENCE TO RELATED APPLICATIONS

N/A

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND

1. Technical Field

The subject matter relates to an apparatus for water treatment. The subject matter may relate to an apparatus for stormwater runoff treatment.

2. Description of Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Generally, as of 2015, 772 communities in the United States have combined sewer systems, serving about 40 million people in cities through the United States of America. In these cities, stormwater and sanitary sewers are combined, rather than separated. The Environmental Protection Agency (EPA) Clean Water Act established in 1948 and amended in 1972, regulates surface discharge of waters into the streams and rivers. Overflows of raw sewage and inadequately controlled stormwater discharges from municipal sewer systems known as Combined Sewer Overflows (CSO's) and Storm Sewer Overflows (SSO's) has created a complex and costly challenge to these cities in reducing combined sewer overflows and sanitary sewer overflows that occur under relatively small rainfall events. These overflows are considered one of the major contributors to pollution of water systems. Typically, many of the Combined Sewer Overflows (CSO) and Storm Sewer Overflows (SSO) locations can be in flood plain areas, which have been modified since the early to mid-1800's during the Industrial Revolution for the purposes of establishing a railroad infrastructure and waterway infrastructure for moving goods during times of war and peace. Because of this history and the complexity of the combined sewer system, many cities may not afford to meet the EPA's Clean Water Act requirements due to the magnitude of costs that a gray (engineered) solution would require. Many cities are looking to Green stormwater infrastructure as a means to assist in reducing costs and improving water quality to meet the EPA's requirements. In many of these urban areas, however, open green space and the willingness of the private sector to utilize valuable land for this use is equally problematic.

Green stormwater infrastructure techniques, such as bioretention, evapotranspiration, and natural underground storage are currently in practice. These techniques have become Best Management Practices (BMP) for many state environmental protection and natural resource agencies. Advancements in Bioretention medias and functions continue through research, primarily for the purposes of extending the bioretention systems' life expectancy. With the implementation of under-drain systems of bioretention systems, the life expectancy of the system has been increased without losing the high quality of water treatment. The success of evapotranspiration systems is associated with the aesthetics and the creation of open channels and streams, restoring ecosystems in urban areas where they have been lost for decades, if not for centuries. Natural underground storage offers a similar opportunity to re-establish lost or disturbed water tables or perched aquifers, and can occur under streets and sidewalks, which are common within the urban environment. Since streets and sidewalks are in the public domain, this can offer local governments the opportunity to employ this green stormwater BMP without impacting private lands.

However, the current green stormwater Best Management Practices may be limited by cost, the land requirement, and contaminated soils. Costs associated with the acquisition of land, construction, and material can be challenges for the implementation of these BMP's in urban areas. Many of these BMP's are difficult to implement in deep urban areas where minimal land is available and contaminated materials from the industrial age have created more complex environments. Specifically, bioretention and underground storage are difficult to apply in urban environments with contaminated soils, as they can carry the contaminants into adjacent streams and waterways. As with the other green stormwater BMPS mentioned, evapotranspiration creates open channels, requiring specific topography and open space. While successful once they are implemented, the costs, land requirements, and presence of contaminants prevent many communities from using these BMP's.

Therefore, there is a need for an improved apparatus for treating stormwater or wastewater runoff that can at least contribute to the reduction of CSO and SSO activity in a more cost effective manner through ease of implementation.

BRIEF DESCRIPTION OF THE DRAWINGS

The accompanying drawings are incorporated in and constitute part of the specification and illustrate various embodiments. In the drawings.

DETAILED DESCRIPTION OF EXEMPLARY EMBODIMENTS

Figure 1:
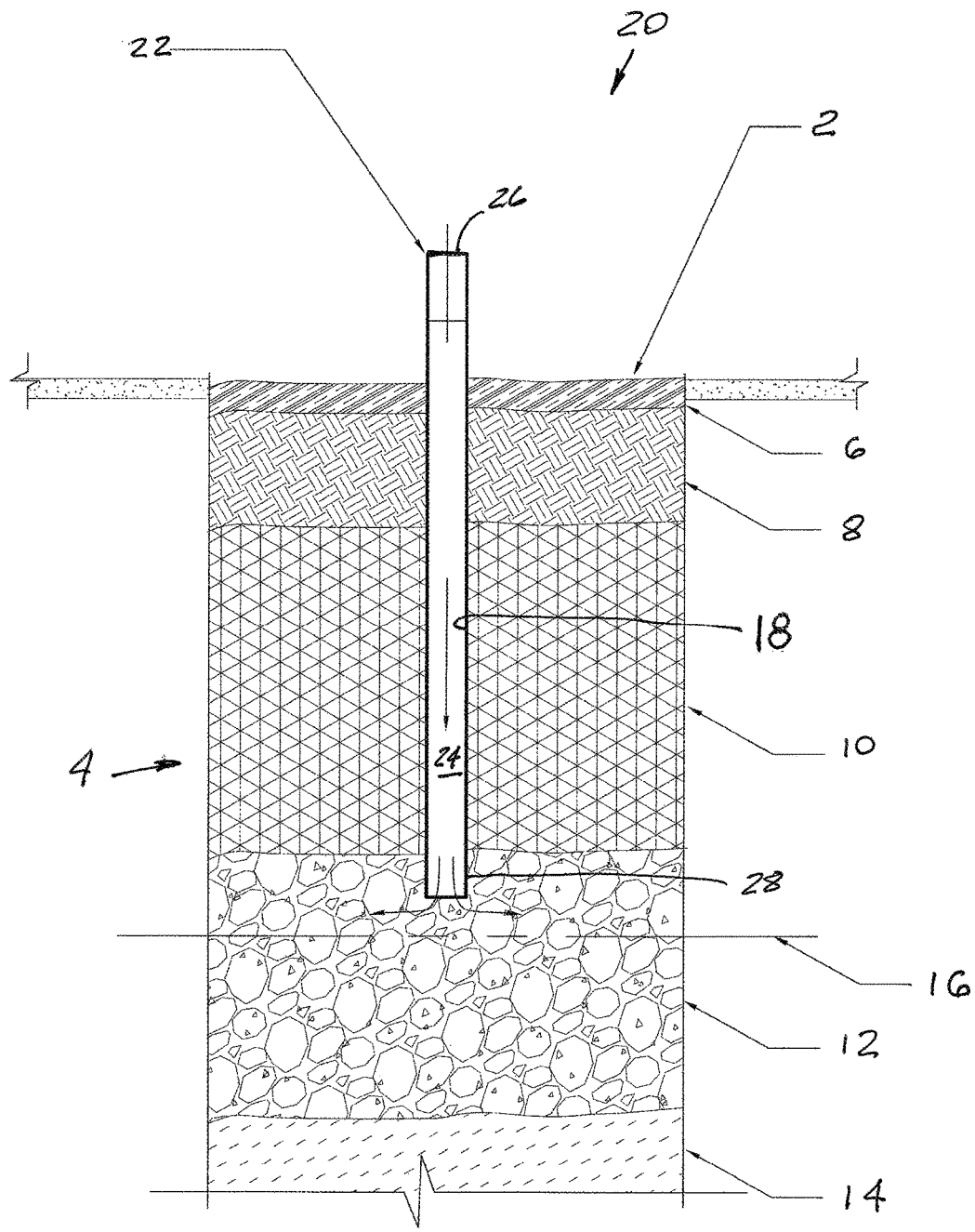
FIG. 1 illustrates an elevation view of one exemplary embodiment of a water runoff treatment apparatus.

Prior to proceeding to the more detailed description of the present invention, it should be noted that, for the sake of clarity and understanding, identical components which have identical functions have been identified with identical reference numerals throughout the several views illustrated in the drawing figures.

The following detailed description is merely exemplary in nature and is not intended to limit the described examples or the application and uses of the described examples. As used herein, the words "example", "exemplary" or "illustrative" means "serving as an example, instance, or illustration." Any implementation described herein as "example", "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," "exterior," "interior," and derivatives thereof shall relate to the invention as oriented in the Figures. Furthermore, there is no intention to be bound by any expressed or implied theory presented in the preceding technical field, background, or the following detailed description. It is also to be understood that the specific devices and processes illustrated in the attached drawings, and described in the following specification, are simply examples of the inventive concepts defined in the appended claims. Hence, specific dimensions and other physical characteristics relating to the examples disclosed herein are not to be considered as limiting, unless the claims expressly state otherwise.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The particular embodiments of the present disclosure generally provide an apparatus directed to treating a water runoff.

The particular embodiments of the present disclosure generally provide an apparatus directed to treating a contaminated water runoff, such as a stormwater runoff and a wastewater runoff.

It is to be understood that the definition of water runoff applies, without limitations, to all water runoff including municipal water infiltration and discharge, general stormwater surface runoff, melt water surface runoff and the release or discharge of impounded waters or industrial process waters. This definition is to include the "Waters of the USA" as defined by EPA and the Army Corp of Engineers in their May 27, 2015 ruling defining waters protected under CWA. Particularly, stormwater is water that originates during precipitation from rain and snowmelt events and then flows over land or impervious surfaces and does not percolate into the soil. Stormwater generally flows directly into surface waterways or is channeled into storm sewers, which eventually discharge to surface waters.

Reference is now made, to FIGS. 1-13, wherein there is shown a water treatment apparatus, generally designated as 20.

Figure 2:
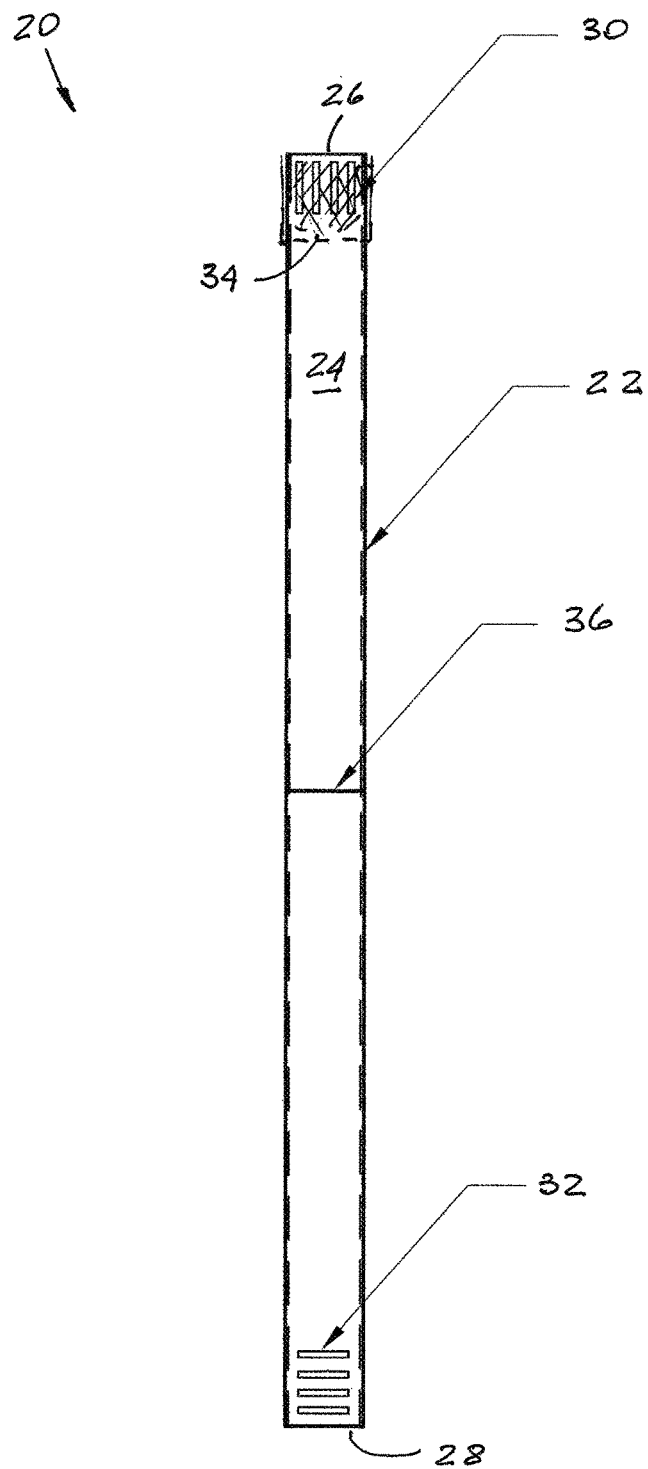
FIG. 2 illustrates an elevation view of an elongated member employed within the apparatus of FIG. 1.

Now in reference to FIGS. 1-2, the apparatus 20 comprises an elongated member 22 mounted vertically, during use of the apparatus 20. The elongated member 22 comprises a hollow interior 24, a first terminal or upper end 26 and a second terminal or bottom end 28. The elongated member 22 is mounted so that the first end 26 is positioned above the surface that the water to be treated will accumulate on. The first end 26 may be completely open to receive water therethrough. The first end 26 may be closed with the apparatus 20 further comprising opening(s) 30 formed through a wall thickness of a length portion of the elongated member 22 adjacent the first end 26 thereof. The opening(s) 30 may be of any shape, round, oblong, triangular, square, rectangular, etc, and/or size sufficient to receive water therethrough. A longitudinally opposite second end 28 of the elongated member 22 is positioned below the ground surface. The second end 28 may be also open and sized and shaped to expel water from the hollow interior 24. The second end 28 may be closed with the apparatus 20 further comprising opening(s) 32 formed through the wall thickness of a length portion of the elongated member 22 adjacent the second end 28 thereof. The opening(s) 32 may be of any shape, round, oblong, triangular, rectangular, etc, and/or size sufficient to expel water from the hollow interior 24. The opening(s) 30 and 32 may be identical in shape and size, may have identical shape but different size, may have identical size but different shape or may be different from each other. The opening(s) 30, 32 may be provided through the thickness of the respective closed end 26 or 28 either in addition or instead of the opening(s) through the wall thickness of the elongated member 22.

The water treatment apparatus 20 may be used for treating stormwater runoff.

When the water treatment apparatus 20 is used for treating stormwater runoff, the elongated member 22 can be mounted vertically, during use of the apparatus 20, within a vertical well 18 provided in a soil structure 4. The first end 26 of the elongated member 22 is positioned above the ground level or surface 2.

The elongated member 22 may be constructed from any suitable material, for example a metal, a polymer, an alloy or any combination thereof. In one form, the elongated member 22 may be constructed from a metal selected from a ductile-iron, a carbon steel, aluminum, stainless steel or any combination thereof. In another form, the elongated member 22 may be constructed from a polymer selected from High Density Polyethylene, Polypropylene (PP) Polyethylene (PE) Low-density polyethylene, Linear low-density polyethylene, Polyvinyl chloride (PVC) Polystyrene (PS) Acrylonitrile butadiene styrene (ABS) or any combination thereof.

For the sake of reader convenience, the soil structure 4 is shown in various figures as comprising the conventional soil layer types which, in a downward order starting from the ground surface 2, include a man-made or disturbed surface layer 6, clay or organic layer 8, a contaminated soils layer 10, alluvial layer 12 and Rock layer 14. Alluvial layer 12 also defines a water table level 16.

Now in a further reference to FIG. 1, when the water treatment apparatus 20 is used for treating stormwater runoff, the second end 28 may be positioned within and only within the alluvial layer 12 above the water table level 16 so as to take advantage of the filtering properties of such alluvial layer 12. The adjustment of the position of the second end 28 will be dictated by the depth of the alluvial materials that may have a porosity permitting adequate reception of the stormwater and providing natural filtering of suspended solids within the stormwater. In one example, the stormwater to be treated may be received through an open end 26. In another example, the stormwater to be treated may be received through opening(s) 30. In another example, the stormwater to be treated may be received through a combination of the open end 26 and the opening(s) 30.

In another example of FIG. 2, the apparatus 20 may also comprise optional filter member(s) 34 to filter the water flow through the opening(s) 30 and/or the open end 26 into the hollow interior 24. Such filtering member 34 may be provided as a unitary member affixed to an exterior surface of the elongated member 22 in a position covering the opening(s) 30 or may be provided to fit within the periphery of opening(s) 30. The filtering member 34 may be also positioned to cover the open end 26 either with or without the openings 30. In one form, the filtering member 34 may be configured only as an oil and grease trap. In one form, the filtering member 34 may be configured to trap other contaminants, for example such as heavy metals.

When the water treatment apparatus 20 is used for treating stormwater runoff and when the apparatus 20 is positioned within the well 18, the elongated member 22 may be provided in two or more rigid sections with each pair of sections connected by a splice 36 that may be a conventional weld. The splice 36 may be also provided by a pair of complimentary threaded connections. The number of sections can be determined by the distance of the water table level 16 from the ground surface 2 when the bottom end 28 is to be positioned above such water table level 16. Although, it is also contemplated herewithin that the apparatus 20 is operable even when the bottom end 28 is positioned at or below such water table level 16.

The well 18 may be first defined in the soil structure 4 by any conventional operations, for example such as drilling with an auger. The elongated member 22, of a rigid type, may be generally pounded into the well 18 until the bottom end 28 is in an operative position at, above or below the water table level 16.

The elongated member 22, in this and following exemplary embodiments, can be also manufactured from a flexible tubular material and does not have to be rigid.

Figure 3:
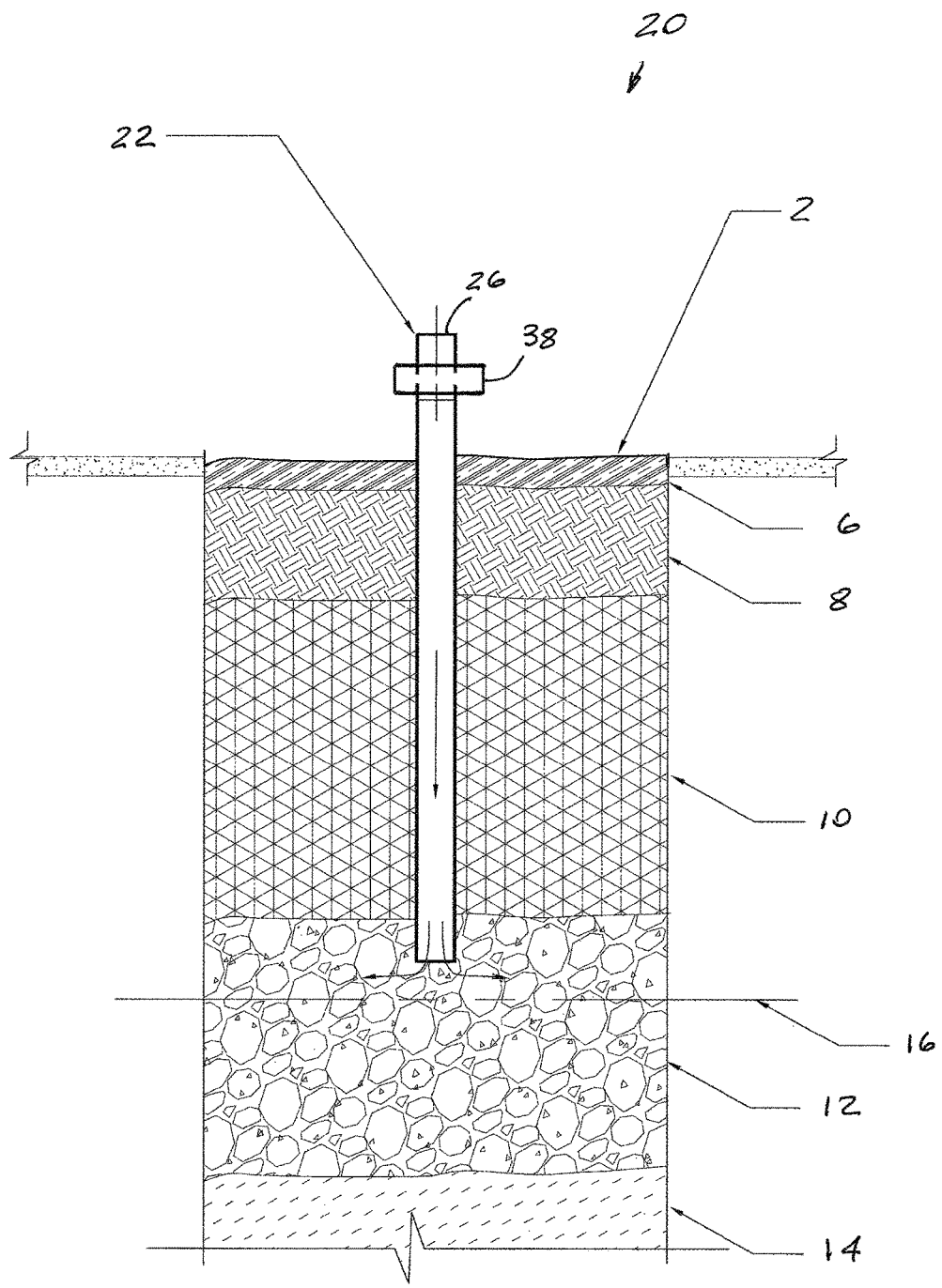
FIG. 3 illustrates an elevation view of another exemplary embodiment of a water runoff treatment apparatus.
Figure 5:
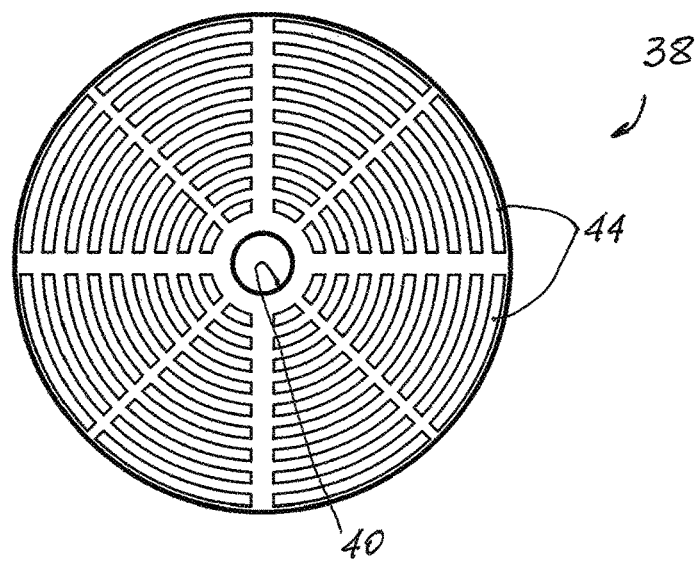
FIG. 5 illustrates a top view of the filtration member of the apparatus of FIG. 3.
Figure 4:
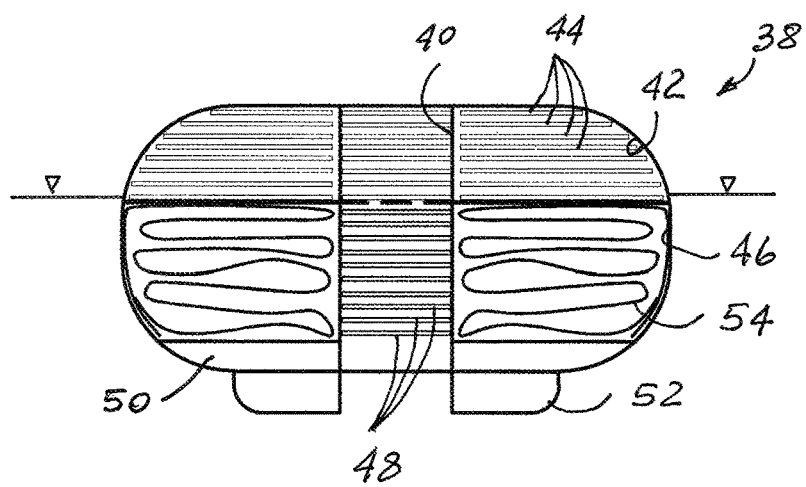
FIG. 4 illustrates an elevation view of a filtration member employed within the apparatus of FIG. 3.

Now in reference to FIGS. 3-5, the apparatus 20 may employ an optional filtration member 38. The optional filtration member 38 can be mounted for a linear reciprocal movement along the elongated member 22 so as to at least separate oil and grease from the water runoff. The optional filtration member 38 can be mounted stationary on the exterior surface of the elongated member 22 or for a reciprocal linear movement thereon.

In a particular reference to FIG. 4, the filtration member 38 includes a center bore 40 sized and shaped for mounting the filtration member 38 on an exterior surface of the elongated member 22 for either one of such stationary mounting or for such linear reciprocal movement due to levels of the stormwater runoff accumulating above the ground surface 2. The filtration member 38 is sized and shaped to cover the opening(s) 30 formed through the wall thickness of the elongated member 22 during the stationary mounting or during the linear reciprocal movement.

The filtration member 38 also includes a first hollow chamber 42 and intake opening(s) 44 formed through a wall thickness of the filtration member 38 in the first hollow chamber 42. The filtration member 38 also includes a second hollow chamber 46 in a fluid communication with the first hollow chamber 42. The second hollow chamber 46 includes discharge opening(s) 48 being in a fluid communication with the opening(s) 30 in the elongated member 12. The optional filtration member 38 further includes an air chamber 50 provided below the second hollow chamber 46 during use of the apparatus 20. A filtering medium 54 is positioned in the second hollow chamber 46 and is configured and operable to at least separate the contaminants from the stormwater runoff received through the intake opening(s) 44 prior to discharging the filtered water runoff through the discharged opening(s) 48 into the hollow interior 24 of the elongated member 22 through the opening(s) 30. The filtering medium 54 can consist of a carbon fiber, a woven, manufactured fibers and any combination thereof, each having an appropriate micron openings to collect pollutants.

When the filtration member 38 is provided and is mounted for the linear reciprocal movement, it may include an optional adjustable buoyancy counter weight 52 disposed on an exterior surface of the filtration member 38 below the air chamber 50. The counter weight 52, when provided, is configured to calibrate the buoyancy of the filtration member 38 such that the filtered water flow is directed into the hollow interior 24.

The top end 26 of the elongate member 22 may be also positioned at a ground level 2 with the optional filtration member 38 mounted stationary on top of the top end 26, during use of the apparatus 20, so that the center bore 40 is essentially aligned with the hollow interior 24 of the elongated member 22.

The bottom end 28 of the elongated member 22 in the embodiments of FIGS. 3-5 does not has to be positioned only within the alluvial layer 12 and can be positioned in other layers, for examples contaminated layer 10 or rock layer 14.

Figure 6:
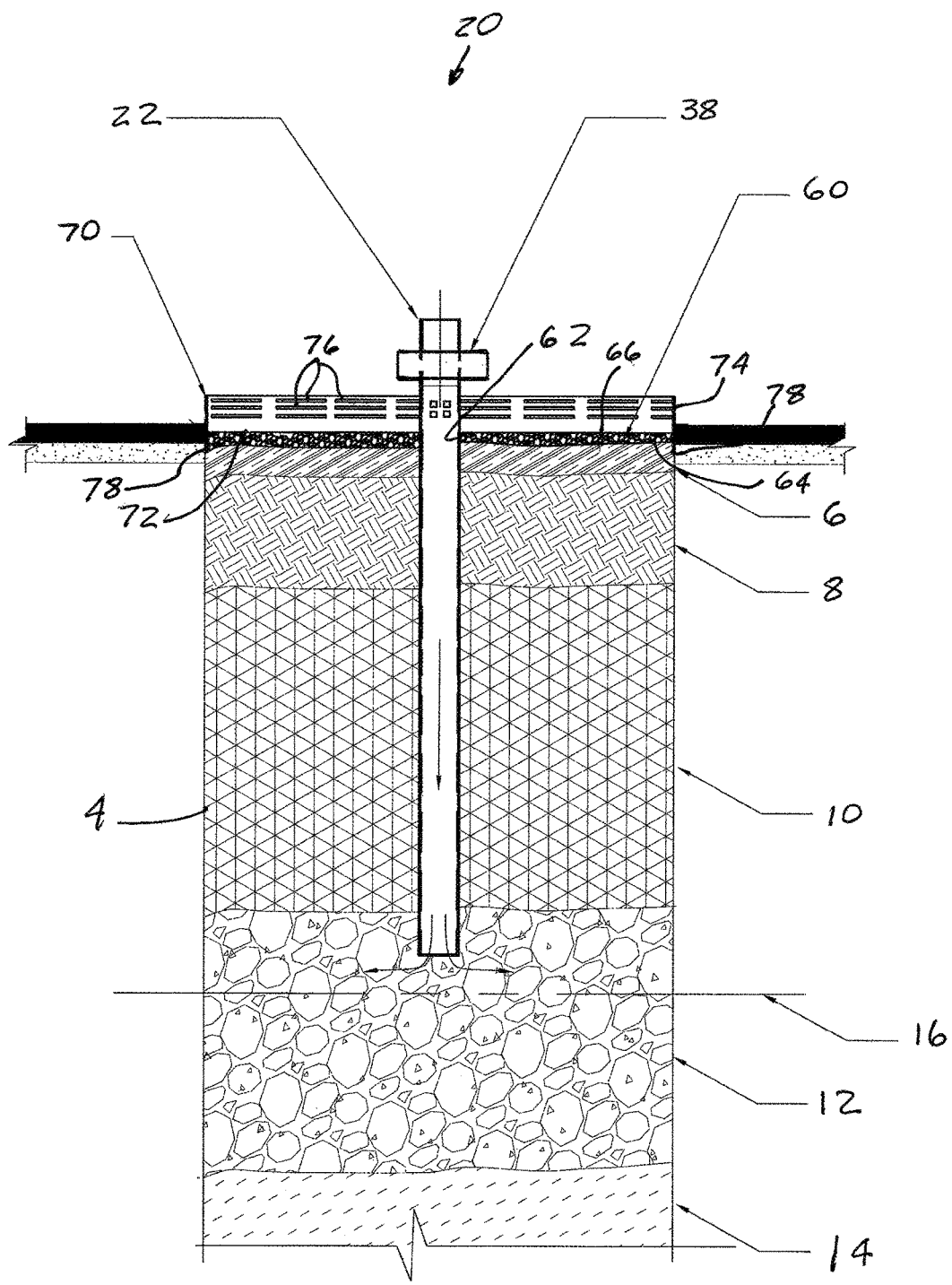
FIG. 6 illustrates an elevation view of another exemplary embodiment of a water runoff treatment apparatus.
Figure 7:
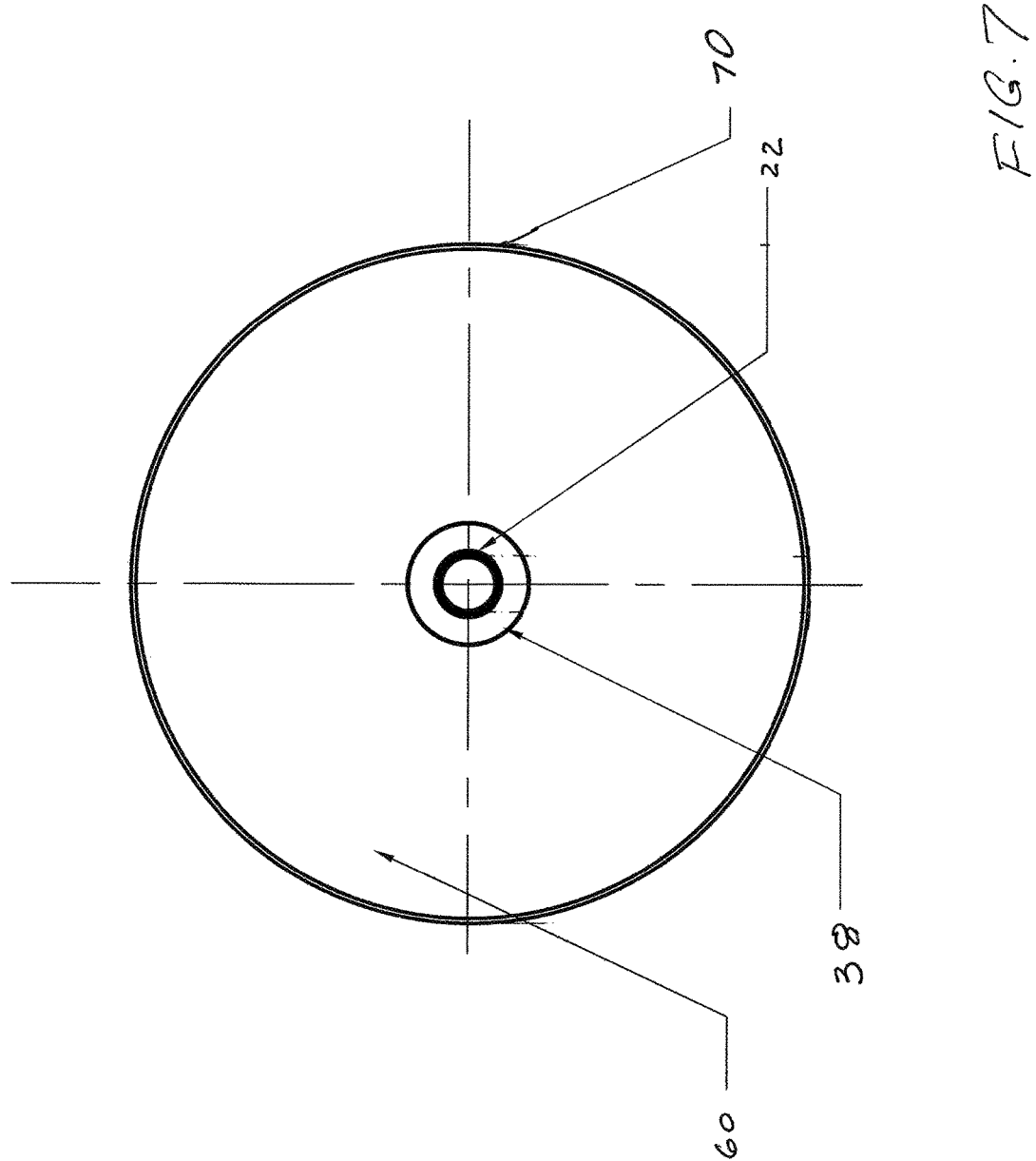
FIG. 7 illustrates a top view of the apparatus of FIG. 6.

Now in reference to FIGS. 6-7, the apparatus 20 may include an optional membrane 60 positioned to surround the elongated member 22 that passes through an aperture 62 in the membrane 60. The aperture 62 may be of any size or shape.

When membrane 60 is provided, it is employed to capture and hold contaminants in the water runoff flow for further treatment or cleaning. Membrane 60 may be also configured to allow passage of the filtered water flow through a thickness thereof. Contaminants may be defined as any unwanted or undesirable constituent or substance. Contaminants may include, but are not limited to, organic substances, hydrocarbons, fluorocarbons, chlorinated solvents, heavy metals, metal oxides, granular materials that may contain organics and metals, oil, grease or other like contaminants. The contaminants may be of any type listed in 40 CFR Part 423, Appendix A, or any equivalents thereof.

The membrane 60 may comprise one or more layers defining a thickness of the membrane 60. A first exterior surface 64 of the membrane 60 may be positioned in a contact with a ground surface of an upper layer 6 of the soil structure 4.

In one form, the membrane 60 may be comprised of a porous non-woven polymer of high surface area and high porosity. The porous non-woven polymer may be fabricated using, for example, electrostatic fiber formation or Electrospinning.

In another form, the membrane 60 may be comprised of woven cloth or wire. In another form, the membrane 60 may be comprised of woven polypropeleyne material. In yet another form, the membrane 60, may be comprised of permeable geotectile propylene-based fabric.

In certain situations, it may be advantageous to adjust the pore size(s) of the membrane 60 to facilitate the removal of pre-identified contaminant(s).

The stormwater or wastewater contaminant may include an organic material, therefore, the pore size of the membrane 60 may be configured to capture and retain organic material(s). Specifically, in this particular embodiment, the membrane 60 may comprise pores being between about 0.177 mm (0.0070 inches) and about 0.037 mm (0.0015 inches) in size.

The stormwater or wastewater contaminant desirous of removal may be a metal. In this particular embodiment, the membrane 60 may comprise pores being between about 63 microns and about 200 microns in size.

The thickness of the membrane 60 may be adjusted based upon the properties of the contaminant in the stormwater or wastewater desirous of removal. For example, the membrane 60 may have any thickness, of 0.02" to about 6.0" in increments of about 0.01"

In one form, there may be one membrane 60. In another form, there may be more than one membrane 60. For example there may be 2 to 6 membranes 60. In situations where more than one membrane 60 is employed, each membranes 60 may be manufactured from or comprise the same material or alternatively, each membrane 60 may be manufactured from or comprise a different material. Similarly, in situations where more than one membrane 60 is employed, the pore sizes in each membrane 60 may be consistent, or the pore size may vary between each membrane 60. Alternatively, there may be multiple pore sizes in one membrane 60.

In one particular embodiment, multiple membrane layers are employed and the membrane 60 layers are installed from the smallest layer to the largest layer, thereby creating a sieve like process, that collects the smallest pollutant elements at the base of the multi-layer membrane 60.

It is also contemplated that the membrane 60 may be provided as a single unitary member or in multiple portions so as to, for example, eliminate the aperture 62.

In one exemplary embodiment, the apparatus 20 may also include an optional trash rack 70. The trash rack 70 may be provided only with the elongated member 22 and may be also provided in a combination with the filtration member 38 and the membrane 60, as is best shown in FIGS. 6-7. The trash rack 70 comprises a bottom wall 72 that can be positioned, during use, in a contact with the opposite surface 66 of the membrane 60, a peripheral side wall 74 upstanding on the bottom wall 72 and optional openings 76 formed through a thickness of the peripheral side wall 74. The peripheral side wall 74 can have any one of a round, triangular, square, rectangular shape and any combination of straight and curved portions to fit within a specific installation or application. The openings 76 may be any size and suitable to collect trash. The trash rack 70 may be manufactured from or comprised of a metal, a polymer, an alloy or any combination thereof. The trash rack 70, when used, is configured to collects debris/trash that can be accumulated in and carried by stormwater or wastewater flow.

In one form, the trash rack 70 may be provided without the bottom wall 72, particularly when presence of debris/trash is not expected, for example when the apparatus 20 is to be used in the below mentioned green roof or overpass applications. In another form, the trash rack 70 may be also sized and configured so as to receive the membrane 60 therewithin, on the inner surface of the bottom wall 72.

In these and other exemplary embodiments employing the trash rack 70, in one form, such trash rack 70 may be simply placed onto the membrane 60 or the ground surface 2 without any fastening or securement, particularly when the water flow is not estimated as sufficient to dislodge the trash rack 70, for example simply due to weight thereof. In another form, the trash rack may 70 be secured to prevent movement thereof, for example, with spikes 78 that extend into the ground surface 2. Such spikes 78 can be extensions of the peripheral side wall 74, as is best shown in FIG. 6 or could be independent spikes (not shown) driven through the bottom wall 72 or engaging the peripheral side wall 74.

The membrane 60 may be inserted into the trash rack 70 or may be provided integral with the bottom of wall of such trash rack 70. It is not necessary that the membrane 60 covers the entire surface of the trash rack 70 and may only occupy a portion thereof, for example in an area surrounding the elongated member 22. It is also contemplated that the membrane 60 may extend past the peripheral edge of the trash rack 70, for example in an application where heavy metals are expected to be present in higher than average concentration.

Figure 8:
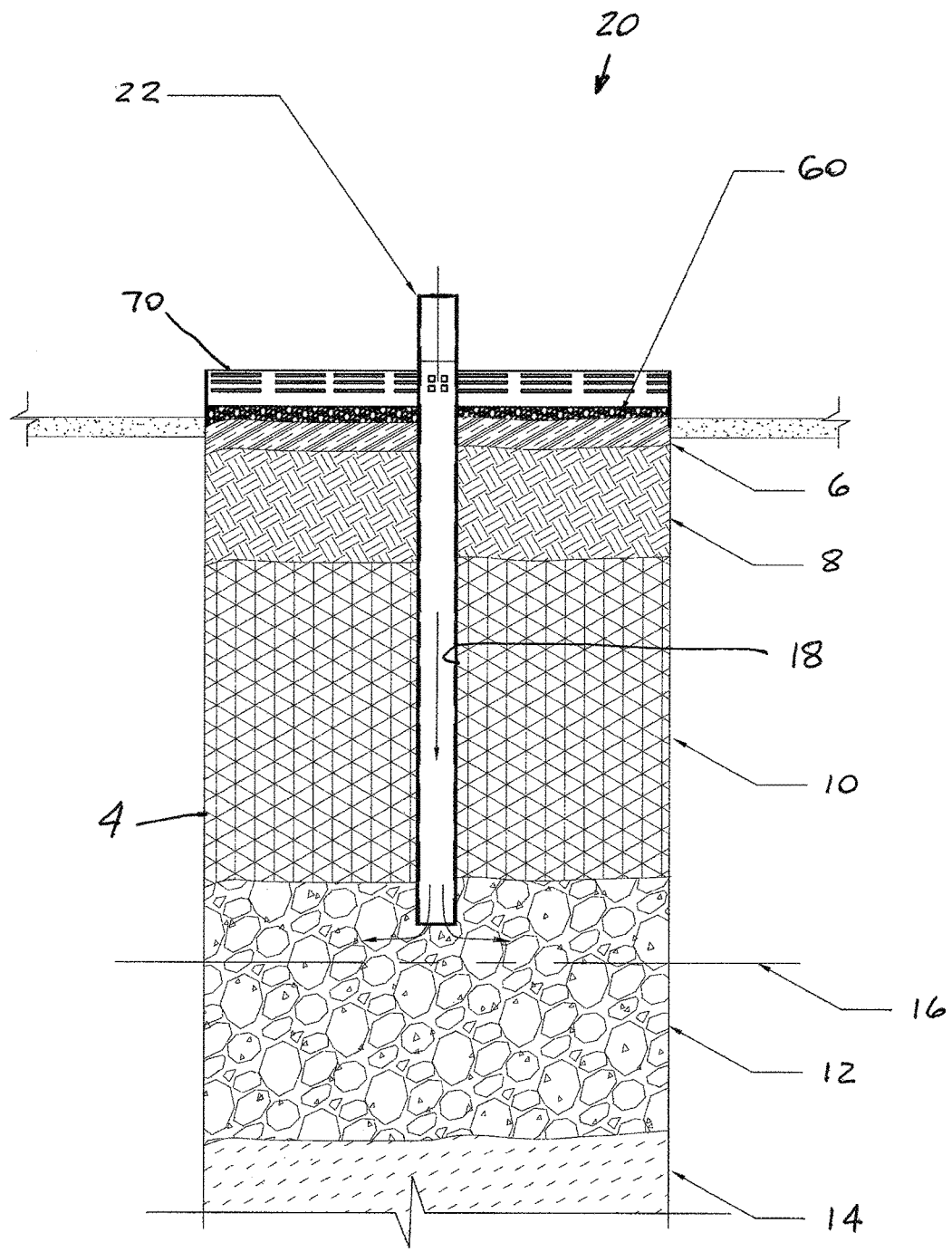
FIG. 8 illustrates an elevation view of another exemplary embodiment of a water runoff treatment apparatus.

Now in reference to FIG. 8, the apparatus 20 may comprise the above described membrane 60 and trash rack 70 but without the filtration member 38.

In this and other embodiments, the trash rack 70 may define a barrier to a flow of the water prior to entering the hollow interior 24 of the elongated member 22, where the size and quantity of openings 76 may be adjusted or selected based on the maximum expected flow and size of the opening(s) 30.

Figure 9:
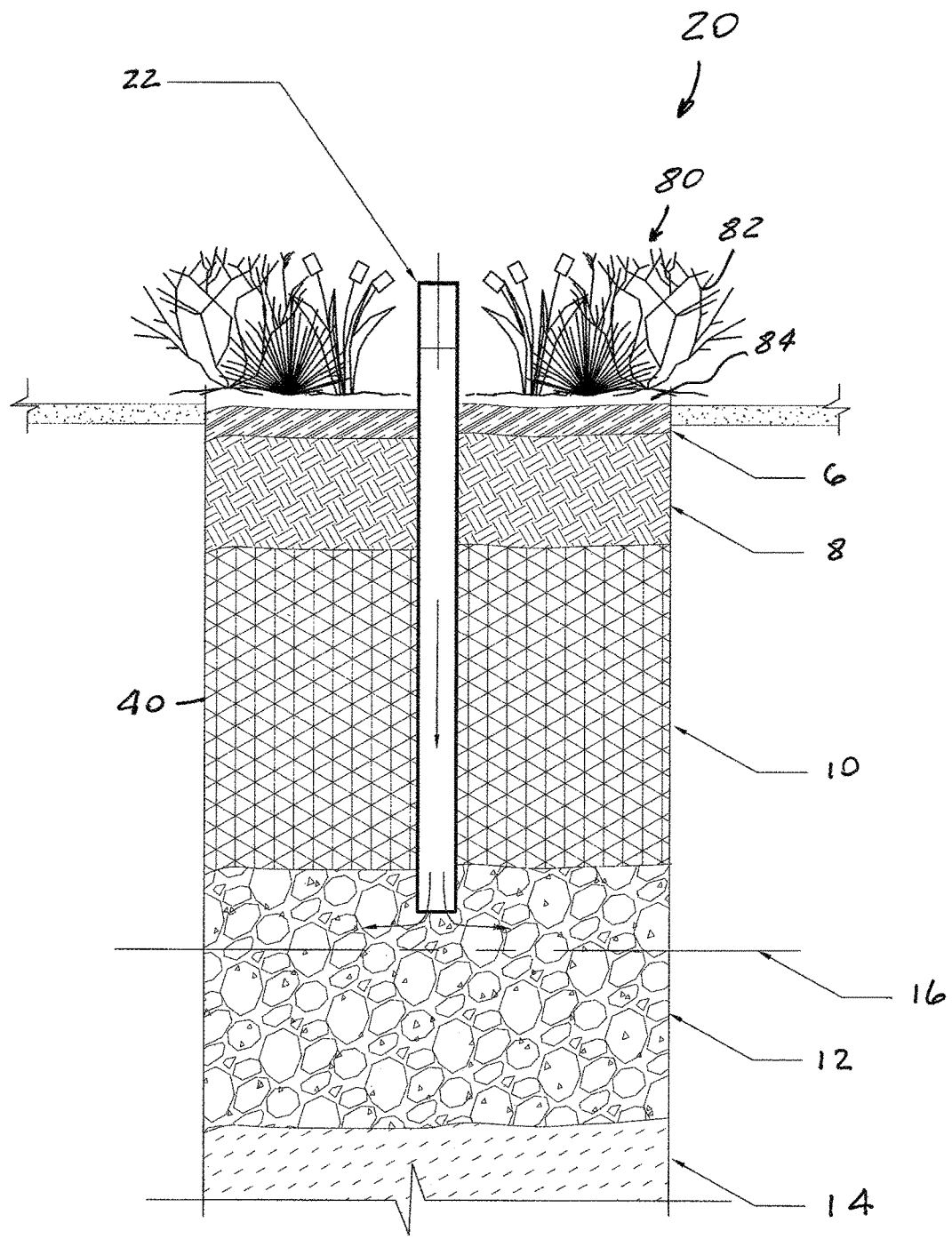
FIG. 9 illustrates an elevation view of another exemplary embodiment of a water runoff treatment apparatus.

Now in reference to FIG. 9, the apparatus 20 may comprise a barrier 80 comprising living and/or artificial plants 82. The plants 82 may be also positioned in a peripheral arrangement configured to reduce water flow and/or absorb a portion of the contaminant(s) prior to the water entering the hollow interior 24. In other words, the plants 82 may act as an energy dissipater slowing water flow.

Living plants 82 may be capable of at least one of phytoremediation (phytodegradation, phytoextraction, phizodegradation, phytoextraction, hyperaccumulation), bioremediation and filtration. Living plants 82 may be herbaceous and/or woody, perennials and/or annuals or any combination thereof.

The living plants 82 can be selected based on at least one of the geographical location of the apparatus 20, growing conditions associated with the geographical location of the apparatus 20, interactions of selected plants 82 with the native plant species and the type of contaminants that may be present in the water runoff. By way of selected examples only, Western wheat grass (*Agropyron smithii*) may be used for hydrocarbons, Honey locust (*Gleditsia triacanthos*) for extracting and accumulating lead, Mulbery (*Morus rubra*)

for degrading phenolic materials in printed circuit boards (PCBs), and Violets (Viola spp) for accumulating or extracting metals.

At least the root(s) of the living plant(s) 82 may be placed within a plant membrane(s) 84 that prevents soil erosion and nutrient loss. The plant membrane 84 may be positioned adjacent a top surface of the membrane 60, when such membrane 60 is provided. In one exemplary embodiment, the growth of the living plant(s) 82 can be started off site and at least partially grown plants 82 will be planted in the plant membrane 64. In an alternative embodiment, the plant(s) 82 can be grown from seed in the plant membrane 84. In yet an alternative embodiment, seeds may be added to the plant membrane 84 that already includes at least partially grown living plant(s) 82.

The plant membrane 84 may be made of any suitable material that is capable of wrapping the soil in a layer, permitting water to infiltrate the roots of plants 82 but also preventing soil erosion. Examples of suitable materials include for example a geotextile material or burlap.

The barrier 80, comprising plants 82, may be also configured or operable to shield the upper end 26 and/or filtration member 38 from direct view and at least obscure presence of the apparatus 20 and/or fit within a landscape, thus promulgating use of the apparatus 20 in open green space(s) and in spaces where private sector may be unwilling to implement conventionally available green stormwater infrastructure.

Figure 10:
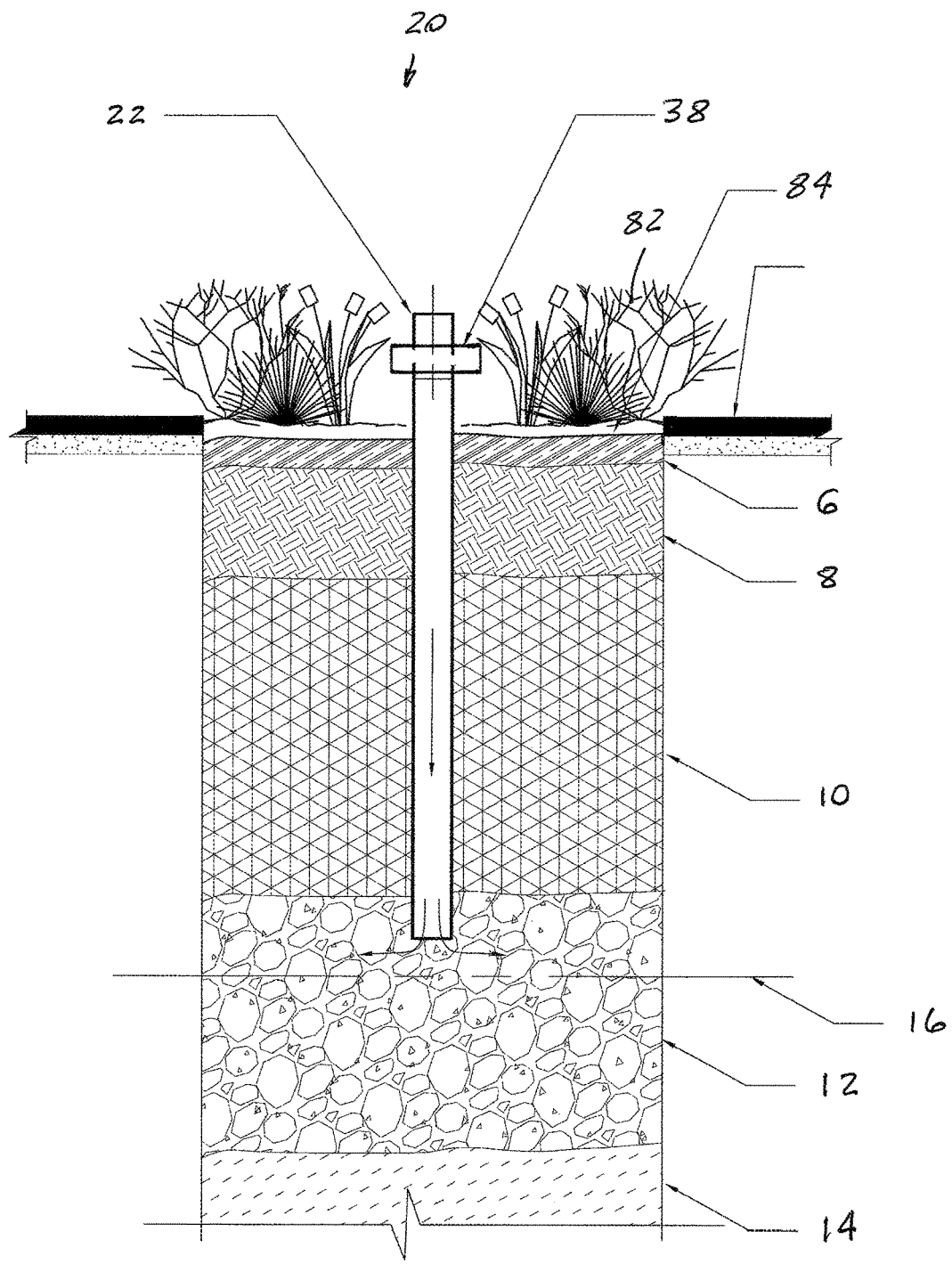
FIG. 10 illustrates an elevation view of another exemplary embodiment of a water runoff treatment apparatus.

Now in reference to FIG. 10, the plants 82 may be provided in a combination with the filtration member 38 at least for the purposes of slowing the water flow into the interior of the filtration member 38.

Figure 11:
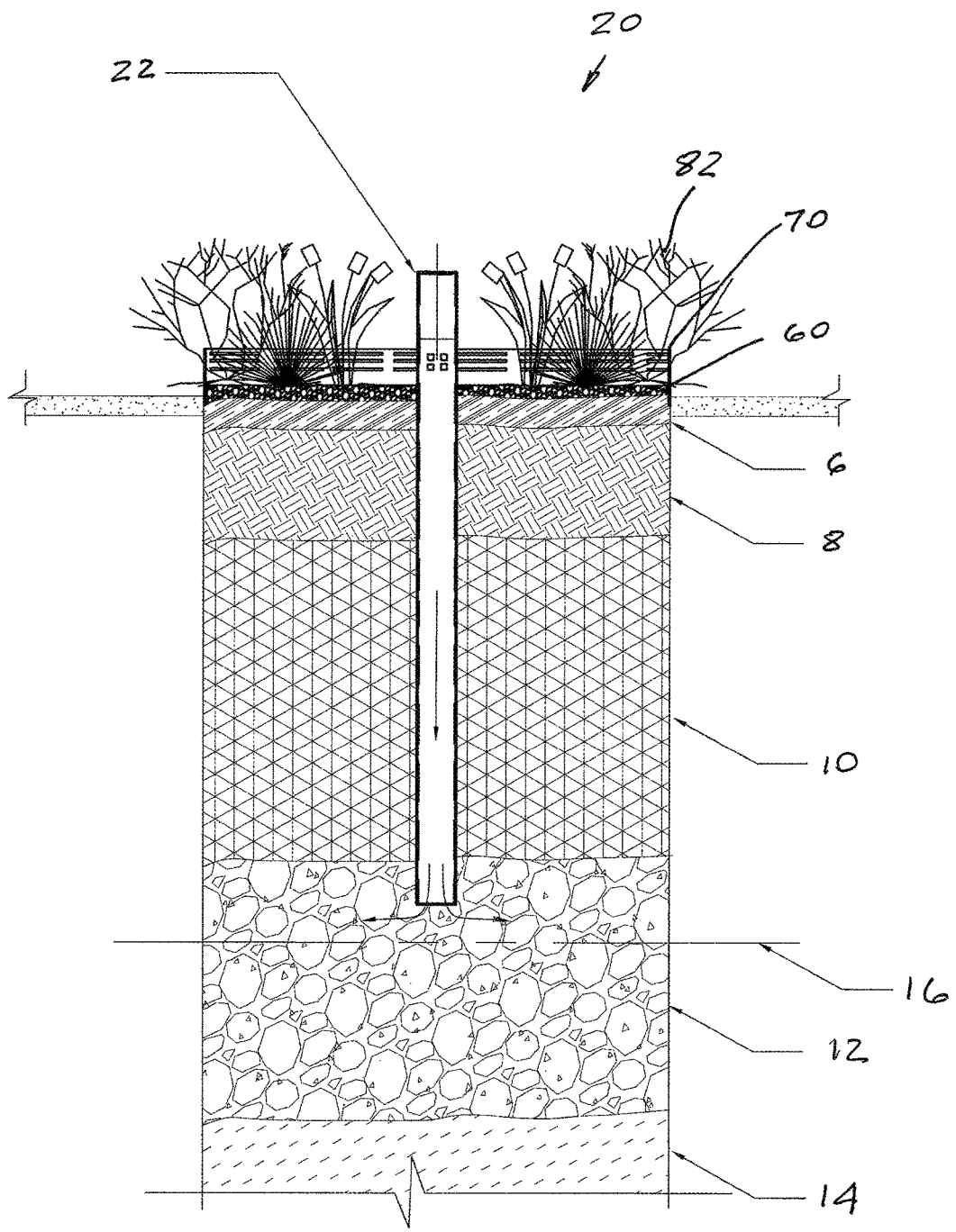
FIG. 11 illustrates an elevation view of another exemplary embodiment of a water runoff treatment apparatus.

Now in reference to FIG. 11, the apparatus 20 includes the above described elongated member 22, membrane 60, trash rack 70 and plants 82. The plants 82 may be positioned adjacent (inside or outside) and/or on the peripheral side wall 74 of the trash rack 70.

Figure 12:
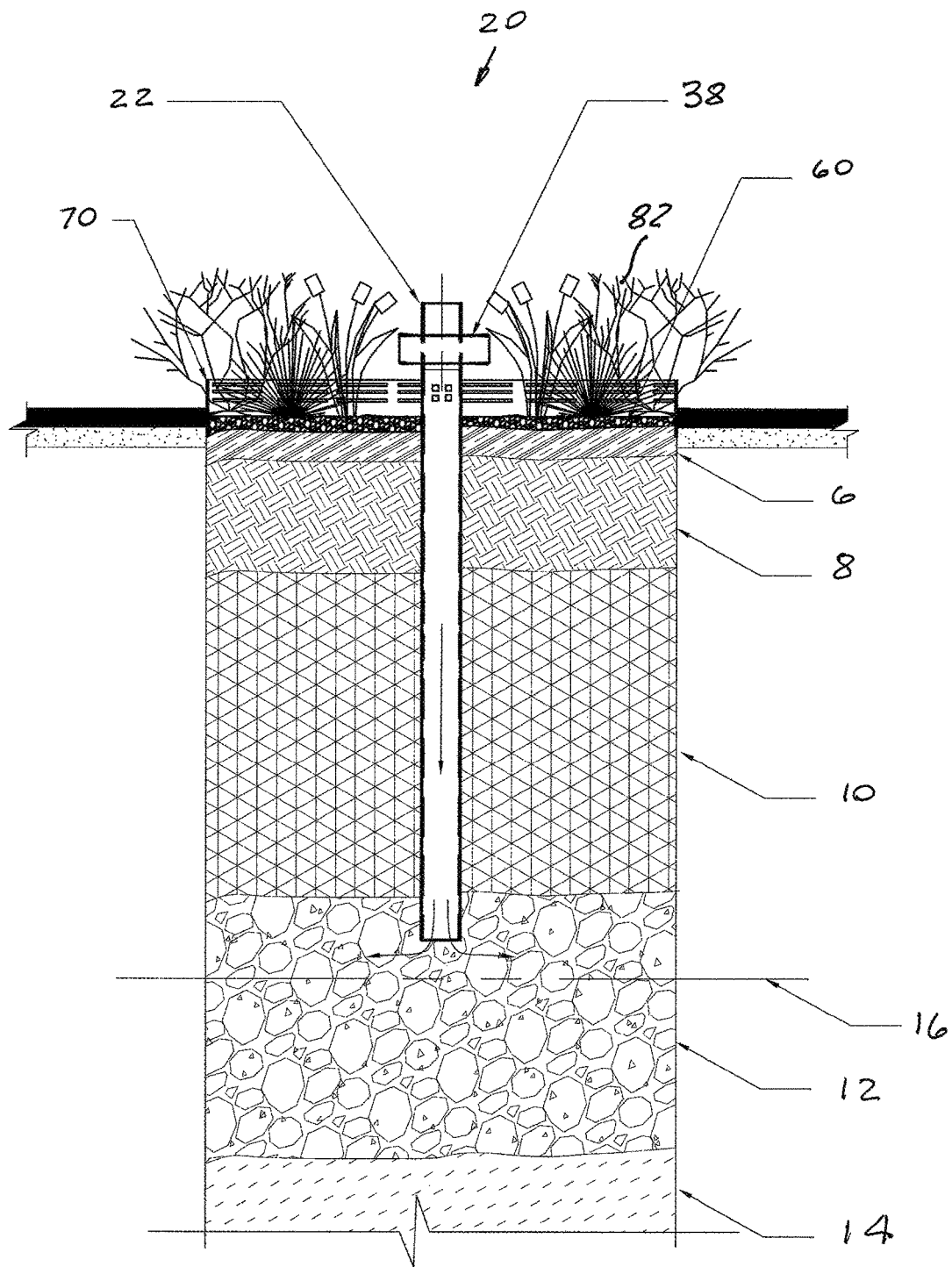
FIG. 12 illustrates an elevation view of another exemplary embodiment of a water runoff treatment apparatus.

In reference to FIG. 12, the apparatus 20 includes the above described elongated member 22, the filtration member 38, the membrane 60, the trash rack 70 and plants 82. The plants 82 may be positioned adjacent (inside or outside) and/or on the peripheral side wall 74 of the trash rack 70.

The apparatus 20 of FIGS. 10-12 provides for a multi-stage treatment arrangement, wherein each of the filtration member 38, the membrane 60, the trash rack 70 and the barrier 80 is configured and operable to perform a specific task. By way of one example only, the filtration member 38 may be configured to trap grease and oil, the membrane 60 may be configured to trap heavy metals, the trash rack 70 being configured to contain debris or objects within the water runoff and the barrier 80 being configured to handle organic matter.

To install the apparatus 20 in accordance with any of the above described embodiments, the elongated member 22 is placed within the well 18. The bottom end 28 of the elongated member 22 may be position above the water table 16 within the alluvial level 12. The filtration member 38, when provided, is mounted onto the upper end 26 or the exterior surface of the elongated member 22 and may be configured to move in a vertical direction on the exterior surface by the levels of water runoff.

The membrane 60, when provided is positioned so as to contain the elongated member 22 therewithin. For example, the elongated member 22 may be centered within the area of the membrane 60. One or both of the trash rack 70 and the barrier 80, when provided, is/are also positioned to surround the elongated member 22.

In all of the above described exemplary embodiments, the apparatus 20 is provided without a need for an underground chamber, particularly of a water impermeable type, which reduces installation and overall project costs.

Figure 13:
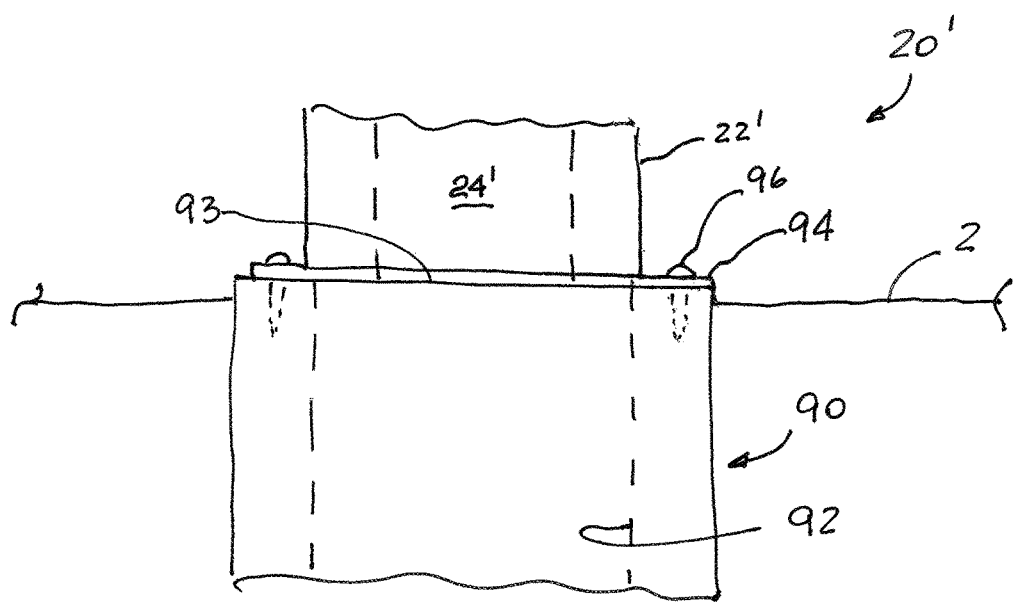
FIG. 13 illustrates an elevation view of another exemplary embodiment of a water runoff treatment apparatus.

Now in reference to FIG. 13, it is also contemplated herewithin that any one of the above described embodiments can be employed with existing well being different than the above described well 18, for example such as an existing sump structure 90 with the internal bore 92, that can be manufactured from a concrete material. The apparatus 20' is represented herewithin by a member 22' with the hollow interior 24' and being adapted with one or more flanges 94 that are fastened to the upper surface 93 of the structure 90, for example with suitable fasteners 96. The one or more flanges 94 can be a continuous peripheral flange or provided as a plurality of flanges or brackets. Such one or more flanges 94 can be provided integral with the member 22' as a unitary construction, for example by way of a molding process, or can be mounted to the member 22' by any conventional methods, for example such as welding or mechanical fastening. Any one of the above described upper portion of the elongated member 22, filtration member 38, membrane 60, trash rack 70 and plant barrier 80 may be used in the exemplary embodiment of FIG. 13 and is being omitted herewithin for the sake of brevity.

Figure 14:
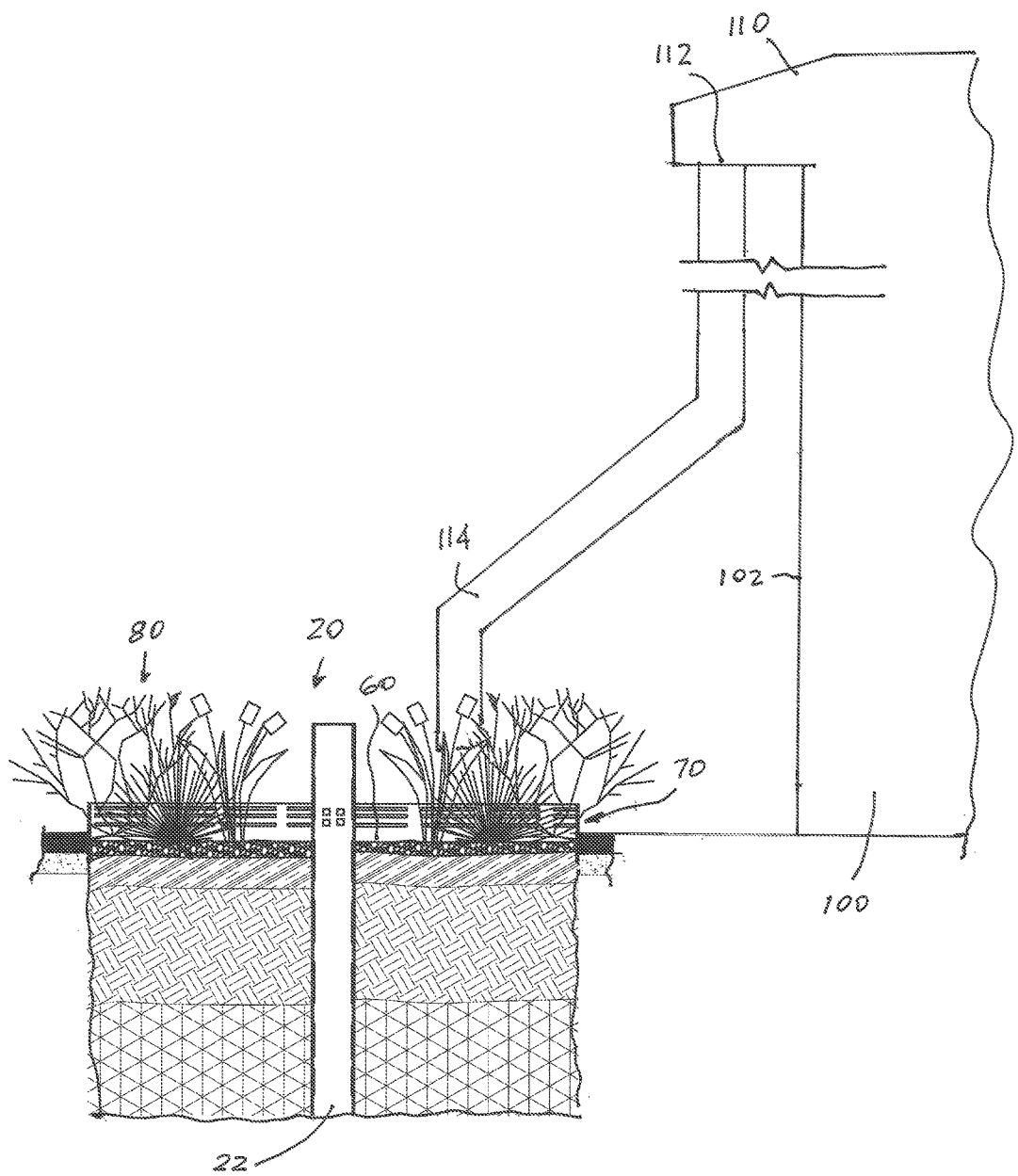
FIG. 14 illustrates an elevation view of another exemplary embodiment of a water runoff treatment apparatus.

It is further contemplated herewithin that the subject matter can be employed for treating water run-off from a roof 110 of a dwelling 100. The dwelling 100 can be any one of a residential, commercial, industrial, military, or any other dwelling types. The roof 110 can be a conventional flat roof or what is conventionally known as a green roof. In one form of FIG. 14, the apparatus 20 of any one of the above described embodiments can be provided adjacent to an exterior wall 102 of the dwelling 100. A bottom end of a drain pipe 114 (that can be of any shape) from a drain 112 used with the roof 110, can be then position to discharge water runoff next to the elongated member 22, wither internal or external to the trash rack 70, when in use. In another form, a modified apparatus, for example the apparatus 20' of FIG. 13 may be configured and/or adapted to replace a conventional roof drain, with the member 22' configured to have a connection with a ground discharge, for example with the discharge pipe 114 of FIG. 14.

The subject matter can be also used for treating water runoff from other structures, such as roadways, bridges or overpasses, so as to at least remove salt, oil, grease and other contaminants associated with such structures. By way of a non-limiting example, the above described, ground-mounted apparatus 20 of FIG. 14 can be located to receive discharge from the pipe 114 that is connected to a drain of the overpass structure, which is not shown for the sake of brevity.

In a particular exemplary embodiment, an apparatus for water runoff treatment comprises a membrane, an elongated member, a filtration member, a trash rack and a barrier.

In an exemplary particular embodiment, an apparatus for water runoff treatment comprises an elongated member positioned vertically, during use of said apparatus, within a vertical well provided in a soil structure, and a filtration member.

In a particular exemplary embodiment, an apparatus for water runoff treatment comprises an elongated member positioned vertically, during use of said apparatus, within a vertical well provided in a soil structure and a filtering component.

In a particular exemplary embodiment, an apparatus for water runoff treatment comprises an elongated member mounted vertically, during use of said apparatus in a soil structure. The elongated member comprises a hollow interior, a first end positioned above ground level, and a second end positioned within and only within an interior alluvial soil layer of the soil structure, said second end being sized and shaped to expel treated water runoff therefrom.

In a particular exemplary embodiment, an apparatus is provided for treating water runoff prior to a passage of the water runoff into a well within a soil structure, the apparatus comprises a member comprising a hollow interior being sized and shaped to align with the well and one end thereof configured to cover an open end of the well, opening(s) formed through a wall thickness of the member, and filtration member(s) mountable, stationary or for a linear reciprocal movement on an exterior surface of the member due to levels of the water runoff, to cover the opening(s) during use of the apparatus, the filtration member(s) being configured and operable to at least separate contaminant(s) from the water runoff prior to discharging the filtered water runoff through the opening(s) into the hollow interior of the elongated member.

In a particular exemplary embodiment, an apparatus for water runoff treatment comprises a first membrane comprising one or of more layers defining a thickness of the membrane, a first exterior surface thereof positioned in a contact with a surface of an upper layer of a soil structure and an aperture formed through a thickness of the first membrane; an elongated member mounted vertically, during use of the apparatus, through the aperture in the first membrane, and positioned within a vertical well provided in the soil structure, the vertical well being in an operative alignment with the aperture in the first membrane, a second membrane disposed in a peripheral pattern on a second exterior surface of the first membrane so as to surround the portion of the elongated member extending above the first membrane; and living plants upstanding on the second membrane, with the second membrane at least partially containing roots of the living plants.

In one exemplary embodiment, an apparatus for water runoff treatment comprises a membrane comprising one or of more layers defining a thickness of the membrane, a first exterior surface thereof positioned in a contact with a surface of an upper layer of a soil structure and an aperture formed through a thickness of the membrane; an elongated member mounted vertically, during use of the apparatus, through the aperture in the membrane and positioned within a vertical well provided in the soil structure, the vertical well being in an operable alignment with the aperture in the membrane, the elongated member comprising a hollow interior, a first open end positioned above an opposite surface of the membrane, a second open end positioned within an interior soil layer of the soil structure and sized and shaped to expel treated water runoff therefrom, and at least one opening formed through a wall thickness of the elongated member in a portion thereof extending above the membrane and in an open communication with the hollow interior; a filtration member comprising a center bore sized and shaped for mounting the filtration member on an exterior surface of the elongated member for a linear reciprocal movement due to levels of the water runoff accumulating above the membrane or the surface of the upper layer of the soil structure, a first hollow chamber including intake openings formed through a wall thickness of the filtration member in the first hollow chamber, a second hollow chamber in fluid communication with the first hollow chamber the second hollow chamber including, discharge openings in the second hollow chamber in fluid communication with the at least one opening in the elongated member during the linear reciprocal movement, an air chamber provided below the second hollow chamber during use of the apparatus, an adjustable buoyancy counter weight disposed on an exterior surface of the filtration member below the air chamber, a filtering medium positioned in the second hollow chamber configured and operable to at least separate contaminant(s) from the water runoff received through the intake openings prior to discharging the filtered water runoff through the discharged openings into the hollow interior of the elongated member, and the filtration member being sized and shaped to cover the at least one opening formed through a wall thickness of the elongated member during the linear reciprocal movement; a trash rack comprising a bottom wall positioned in a contact with the opposite surface of the membrane, a peripheral side wall upstanding on the bottom wall and openings formed through a thickness of the peripheral side wall; and a barrier positioned adjacent and/or on the peripheral side wall of the trash rack, the barrier configured to reduce flow of the water and/or absorb a portion of the contaminant(s) prior to the water entering the filtration member.

In one exemplary embodiment, an apparatus for water runoff treatment comprises an elongated member positioned vertically, during use of the apparatus, within a vertical well provided in a soil structure, the elongated member comprising a hollow interior, a first open end positioned above ground level during use of the apparatus, a second open end positioned within an interior soil layer of the soil structure and sized and shaped to expel treated water runoff therefrom, and at least one opening formed through a wall thickness of the elongated member in a portion thereof extending above ground level and in an open communication with the hollow interior; and a filtration member comprising a center bore sized and shaped for mounting the filtration member on an exterior surface of the elongated member for a linear reciprocal movement due to levels of the water runoff accumulating above the membrane, a first hollow chamber including intake openings formed through a wall thickness of the filtration member in the first hollow chamber, a second hollow chamber in fluid communication with the first hollow chamber the second hollow chamber including, discharge openings in the second hollow chamber in fluid communication with the at least one opening in the elongated member during the linear reciprocal movement, an air chamber provided below the second hollow chamber during use of the apparatus, an adjustable buoyancy counter weight disposed on an exterior surface of the filtration member below the air chamber, a filtering medium positioned in the second hollow chamber configured and operable to at least separate undesirable substance(s) from the water runoff received through the intake openings prior to discharging the filtered water runoff through the discharged openings into the hollow interior of the elongated member, and the filtration member being sized and shaped to cover the at least one opening formed through the wall thickness of the elongated member during the linear reciprocal movement. The apparatus in this exemplary embodiment can further comprise a membrane comprising layer(s) defining a thickness of the membrane, a first surface thereof positioned in contact with a surface of an upper layer of a soil structure and an aperture formed through the thickness of the membrane in an alignment with the vertical well. The membrane can comprise a porous non-woven polymer of high surface area and of high porosity fabricated using electrostatic fiber formation or Electrospinning. The pore sizes in the layer(s) and/or the thickness of the membrane can be adjusted (adjustable) based upon properties of the water being treated and/or a material composition being collected. In one form, the membrane can comprise woven cloth and wire. In one form, the membrane can comprise a woven polypropeleyne material. In one form, the membrane can comprise a permeable geotectile propylene-based fabric. The membrane being configured to capture and retain organic material(s) present in the water. The membrane can comprise pores in a thickness thereof, the pores being between about 0.177 mm (0.0070 inches) and about 0.037 mm (0.0015 inches) in size, for example in increments of 0.005 mm. The membrane can be configured to capture and retain metals present in the water runoff. The membrane can comprise pores in a thickness thereof, where the pores can be between about 63 microns and about 200 microns in size, in increments of 1 micron. In this exemplary embodiment, the apparatus can further comprise plants surrounding an upper portion of the elongated member and the filtration member. The plants can be any one of living, artificial, synthetic and any combination thereof. The plants are capable of at least one of phytoremediation, bioremediation and filtration. Living plants can be herbaceous and/or woody. Living plants can be perennials and/or annuals. In this exemplary embodiment, the apparatus can further comprise a trash rack positioned to surround the upper portion of the elongated member and comprising a bottom wall and a peripheral side wall upstanding on the bottom wall. Opening(s) can be formed through a thickness of the peripheral side wall. The elongated member can comprise a metal, a polymer, an alloy or any combination thereof. The metal can comprise one of ductile-iron, carbon steel, aluminum, stainless steel and any combination thereof. The polymer can comprise one of High Density Polyethylene, Polypropylene (PP) Polyethylene (PE) Low-density polyethylene, Linear low-density polyethylene, Polyvinyl chloride (PVC) Polystyrene (PS) Acrylonitrile butadiene styrene (ABS) and any combination thereof. The filtering medium can comprise both natural materials such as sand as well as man-made fabricated mediums such as carbon fiber, electrospun nanofiberous membranes, micro-machined particle fiber membranes. The second open end of the elongated member can be positioned within an alluvial soil layer.

In one exemplary embodiment, an apparatus for water runoff treatment comprises an elongated member positioned vertically, during use of the apparatus, within a vertical well provided in a soil structure, the elongated member comprising a hollow interior, a first open end positioned above or at ground level during use of the apparatus, a second open end positioned within an interior a soil layer of the soil structure and sized and shaped to expel treated water runoff therefrom, and at least one opening formed through a wall thickness of the elongated member in a portion thereof extending above ground level and in an open communication with the hollow interior; and a filtering component positioned to cover the at least one opening, wherein the filtering component operates to separate contaminant(s) from the water runoff prior to a passage of the water runoff into the hollow interior of the elongated member. In this exemplary embodiment, the apparatus can further comprise living plant(s) surrounding an upper portion of the elongated member and the filtration member and capable of at least one of phytoremediation, bioremediation and filtration. In this exemplary embodiment, the apparatus can further comprise a membrane containing roots of the living plant(s). In this exemplary embodiment, the apparatus can further comprise a trash rack positioned to surround an upper portion of the elongated member and comprising a bottom wall, a peripheral side wall upstanding on the bottom wall and opening(s) formed through a thickness of the peripheral side wall. The elongated member can comprise of a metal, a polymer, an alloy or any combination thereof. The second open end of the elongated member can be positioned within an alluvial soil layer.

In one exemplary embodiment, an apparatus for water runoff treatment comprises an elongated member mounted vertically, during use of the apparatus, within a vertical well provided in a soil structure, the elongated member comprising a hollow interior; a first end positioned above ground level; and a second end positioned within and only within an interior alluvial soil layer of the soil structure, the second end being sized and shaped to expel treated water runoff therefrom. In this exemplary embodiment, the apparatus can further comprise opening(s) formed through a wall thickness of the elongated member adjacent the second end thereof. In this exemplary embodiment, the apparatus can further comprise opening(s) formed through a wall thickness of the elongated member adjacent the first end thereof. The first end of the elongated member can be closed and the apparatus can further comprise opening(s) formed through a wall thickness of the elongated member adjacent the first end thereof. The first end can be open and the apparatus can further comprise opening(s) formed through a wall thickness of the elongated member adjacent the first end thereof. In this exemplary embodiment, the apparatus can further comprise a barrier surrounding an upper portion of the elongated member and being configured to reduce flow of the water and/or absorb a portion of the contaminant(s) prior to the water entering the filtration member. The barrier can comprise living plants capable of at least one of phytoremediation, bioremediation and filtration. In this exemplary embodiment, the apparatus can further comprise a trash rack positioned to surround an upper portion of the elongated member, the trash rack comprising a bottom wall, a peripheral side wall upstanding on the bottom wall and openings formed through a thickness of the peripheral side wall. In this exemplary embodiment, the apparatus can further comprise at least one opening formed through a wall thickness of the elongated member in an upper portion thereof extending above the ground level and in an open communication with the hollow interior; and a filtering component positioned to cover the at least one opening, wherein the filtering component operates to separate oil and grease from the water runoff prior to a passage of the water runoff into the hollow interior of the elongated member.

In one exemplary embodiment, an apparatus is provided for treating water runoff prior to a passage of the water runoff into a well within a soil structure. The apparatus comprises a member comprising a hollow interior being sized and shaped to align with the well and one end thereof configured to cover an open end of the well; opening(s) formed through a wall thickness of the member; and filtration member(s) mountable, stationary or for a linear reciprocal movement on an exterior surface of the member due to levels of the water runoff, to cover the opening(s) during use of the apparatus, the filtration member(s) being configured and operable to at least separate contaminant(s) from the water runoff prior to discharging the filtered water runoff through the opening(s) into the hollow interior of the elongated member.

In one exemplary embodiment, an apparatus for water runoff treatment comprises a first membrane comprising one or more layers defining a thickness of the membrane, a first exterior surface thereof positioned in a contact with a surface of an upper layer of a soil structure and an aperture formed through a thickness of the first membrane; an elongated member mounted vertically, during use of the apparatus, through the aperture in the first membrane and positioned within a vertical well provided in the soil structure, the vertical well being in an operative alignment with the aperture in the first membrane, the elongated member comprising a hollow interior, a first end positioned above an opposite surface of the first membrane, an open second end positioned within an interior soil layer of the soil structure and sized and shaped to expel treated water runoff therefrom, and opening(s) formed through a wall thickness of the elongated member in a portion thereof extending above the first membrane and in an open communication with the hollow interior; a second membrane disposed in a peripheral pattern on a second exterior surface of the first membrane so as to surround the portion of the elongated member extending above the first membrane; and living plants upstanding on the second membrane, the second membrane at least partially containing roots of the living plants. In this exemplary embodiment, the apparatus can further comprise a center bore sized and shaped for mounting the filtration member on an exterior surface of the elongated member for a linear reciprocal movement due to levels of the water runoff accumulating above the first membrane or the surface of the upper layer of the soil structure; a first hollow chamber including intake openings formed through a wall thickness of the filtration member in the first hollow chamber; a second hollow chamber in fluid communication with the first hollow chamber the second hollow chamber including, discharge openings in the second hollow chamber in fluid communication with the at least one opening in the elongated member during the linear reciprocal movement; an air chamber provided below the second hollow chamber during use of the apparatus; an adjustable buoyancy counter weight disposed on an exterior surface of the filtration member below the air chamber; a filtering medium positioned in the second hollow chamber configured and operable to at least separate contaminant(s) from the water runoff received through the intake openings prior to discharging the filtered water runoff through the discharged openings into the hollow interior of the elongated member; and the filtration member being sized and shaped to cover the at least one opening formed through a wall thickness of the elongated member during the linear reciprocal movement. In this exemplary embodiment, the apparatus can further comprise a trash rack comprising a bottom wall positioned in a contact with the opposite surface of the first membrane, a peripheral side wall upstanding on the bottom wall and openings formed through a thickness of the peripheral side wall, the second membrane being disposed inside the trash rack adjacent an inner surface of the peripheral side wall.

In any of the above described embodiments, the elongated member 22 or member 22' may be mounted at an angle or incline relative to the vertical plane, sufficient to allow passage of the filtered water flow into the soil structure.

It is to be also understood that the upper end 26 of the elongated member 22 with or without the filtering member(s) 34 or filtration member 38 may be disposed within a simple pit or indentation (not shown) in the soil structure 4 and may be even flush or below the ground surface 2. A conventional sewer grate (not shown) may be positioned above such upper end 26 and/or filtration member 38 in addition to or instead of the trash rack 70. It is also contemplated herewithin that the upper edge of the trash rack 70 may be disposed at or below the ground surface 2 so as to limit if not eliminate exposure of the apparatus 20 to a direct view and/or fit within a landscape, thus promulgating use of the apparatus 20 in open green space(s) and in spaces where private sector may be unwilling to implement conventionally available green stormwater infrastructure.

The apparatus of any of the above described embodiments, can be easily and economically implemented in private residences, commercial, industrial or government properties, schools, universities, playgrounds, parks, etc, fitting available land parcels.

It is to be understood that features in one embodiment can be used in a different embodiment. By way of one example only, apertures 32 in FIG. 2 may be used in the elongated member 22 in embodiments of FIGS. 3, 6, and 8 through 14.

The chosen exemplary embodiments of the claimed invention have been described and illustrated for practical purposes so as to enable any person skilled in the art to which it pertains to make and use the same. It is therefore intended that all matters in the foregoing description and shown in the accompanying drawings be interpreted as illustrative and not in a limiting sense. It will be understood that variations, modifications, equivalents and substitutions for components of the specifically described exemplary embodiments of the invention may be made by those skilled in the art without departing from the spirit and scope of the invention as set forth in the appended claims.

As will be appreciated by those of ordinary skill in the art, aspects of the various embodiments may be embodied as methods. By way of non-limiting examples, the method of treating water runoff comprises providing an elongated member 22 or the member 22' and mounting such elongated member 22 or the member 22' in a vertical direction or at an incline. The method may first comprise forming a well 18 in the soil structure and mounting the member 22 in the well 18. The method may comprise adapting the member 22' with flange(s) and securing the member 22' onto a well structure. The method may comprise positioning a membrane 60 on the ground surface before or after mounting the elongated member 22 or member 22' and collecting, with membrane 60, contaminants present in the water flow. The method may comprise mounting a filtration member 38 either in a stationary position or for a reciprocal linear movement on the member 22, 22' and at least separating oil and grease from the water flow. The method may comprise mounting or positioning a trash rack 70 in a position to surround the elongated member 22 or the member 22' and collecting, with the trash rack 70, debris and/or trash carried by the water flow. The method may comprise forming a barrier 80 from plants 82 and reducing, with the barrier 80, energy of the water flow and/or absorbing the contaminants in the water flow.

The method can be used for treating a stormwater runoff, a waste or sanitary water runoff, roof water runoff, green water runoff, bridge or an overpass water discharge or runoff.

The claimed subject matter provides an improved apparatus and/or method for treating stormwater or wastewater runoff contributing to the reduction of CSO and SSO activities in a more cost effective manner through ease of construction and implementation.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Unless otherwise indicated, all numbers expressing quantities of elements, optical characteristic properties, and so forth used in the specification and claims are to be understood as being modified in all instances by the term "about". Accordingly, unless indicated to the contrary, the numerical parameters set forth in the preceding specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible.

Any numerical value, however, inherently contains certain errors necessarily resulting from the standard deviations found in their respective testing measurements.

Anywhere the term "comprising" is used, embodiments and components "consisting essentially of" and "consisting of" are expressly disclosed and described herein."

Furthermore, the Abstract is not intended to be limiting as to the scope of the claimed invention and is provided for the purpose of quickly determining the nature of the claimed invention.

What is claimed is:
1. A water runoff treatment apparatus, comprising:
  (a) a membrane comprising one or of more layers defining a thickness of said membrane, a first exterior surface of said membrane positioned in contact with a surface of an upper layer of a soil structure, and an aperture formed through a thickness of said membrane, said aperture aligned with a vertical well provided in the soil structure;
  (b) an elongated member mounted vertically, during use of said apparatus, through said aperture in said membrane and positioned within the vertical well, said elongated member comprising:
    i. a hollow interior,
    ii. a first open end positioned above an opposite second exterior surface of said membrane,
    iii. a second open end positioned within an interior soil layer of said soil structure and sized and shaped to expel treated water runoff therefrom, and
    iv. at least one opening formed through a wall thickness of said elongated member in a portion thereof extending above said opposite second exterior surface of said membrane and in an open communication with said hollow interior;
  (c) a filtration member comprising:
    i. a center bore sized and shaped for mounting said filtration member on an exterior surface of said elongated member for a linear reciprocal movement due to levels of the water runoff accumulating above said opposite second exterior surface of said membrane or the surface of the upper layer of the soil structure,
    ii. a first hollow chamber including intake openings formed through a wall thickness of said filtration member in said first hollow chamber,
    iii. a second hollow chamber in fluid communication with said first hollow chamber said second hollow chamber including, discharge openings in said second hollow chamber in fluid communication with said at least one opening in said elongated member during said linear reciprocal movement,
    iv. an air chamber provided below said second hollow chamber during use of said apparatus,
    v. an adjustable buoyancy counter weight disposed on an exterior surface of said filtration member below said air chamber,
    vi. a filtering medium positioned in said second hollow chamber configured and operable to at least separate contaminant(s) from the water runoff received through said intake openings prior to discharging the filtered water runoff through said discharged openings into said hollow interior of said elongated member, and
    vii. said filtration member being sized and shaped to cover said at least one opening formed through a wall thickness of said elongated member during said linear reciprocal movement;
  (d) a trash rack comprising a bottom wall positioned in a contact with said opposite surface of said membrane, a peripheral side wall upstanding on said bottom wall and openings formed through a thickness of said peripheral side wall; and
  (e) a barrier positioned adjacent and/or on said peripheral side wall of said trash rack, said barrier configured to reduce flow of the water and/or absorb a portion of the contaminant(s) prior to the water entering said filtration member.

2. The water runoff treatment apparatus of claim 1, wherein said membrane comprises a porous non-woven polymer manufactured by electrostatic fiber formation or Electrospinning.

3. The water runoff treatment apparatus of claim 1, wherein pore sizes in said one or more layers and/or said thickness of said membrane are adjusted based upon properties of the water being treated and/or a material composition being collected.

4. The water runoff treatment apparatus of claim 1, wherein said membrane comprises at least one of woven cloth, wire, woven polypropeleyne material, and permeable geotectile propylene-based fabric.

5. The water runoff treatment apparatus of claim 1, wherein said membrane comprises pores in a thickness thereof, said pores being between about 0.177 mm (0.0070 inches) and about 0.037 mm (0.0015 inches) in size.

6. The water runoff treatment apparatus of claim 1, wherein said membrane comprises pores in a thickness thereof, said pores being between about 63 microns and about 200 microns in size.

7. The water runoff treatment apparatus of claim 1, further comprising living plants being one of living, artificial, synthetic and any combination thereof.

8. The water runoff treatment apparatus of claim 1, wherein said filtering medium comprises at least one of natural materials, and man-made fabricated mediums being any one of carbon fiber, electrospun nanofiberous memberane, micro-machined particle fiber membrane.

9. The water runoff treatment apparatus of claim 1, wherein said elongated member is sized so as to position said second open end of said elongated member within an alluvial soil layer.

10. A water runoff treatment apparatus, comprising:
(a) an elongated member positioned vertically, during use of said apparatus, within a vertical well provided in a soil structure, said elongated member comprising:
  i. a hollow interior;
  ii. a first open end positioned above ground level,
  iii. a second open end positioned within an interior soil layer of said soil structure and sized and shaped to expel treated water runoff therefrom, and
  iv. at least one opening formed through a wall thickness of said elongated member in a portion thereof extending above ground level and in an open communication with said hollow interior; and
(b) a filtering component positioned on an exterior surface of said elongated member for a linear reciprocal movement due to levels of the water runoff, said filtering component further positioned to cover said at least one opening during said linear reciprocal movement, wherein said filtering component operates to separate contaminant(s) from the water runoff prior to a passage of the water runoff through said at least one opening into said hollow interior of said elongated member.

11. The water runoff treatment apparatus of claim 10, further comprising plant(s) surrounding said portion of said elongated member extending above the ground level and said filtration member, said plant(s) capable of at least one of phytoremediation, bioremediation and filtration.

12. The water runoff treatment apparatus of claim 10, further comprising a trash rack positioned to surround said portion of said elongated member extending above the ground level and comprising a bottom wall, a peripheral side wall upstanding on said bottom wall and opening(s) formed through a thickness of said peripheral side wall.

13. The water runoff treatment apparatus of claim 10, further comprising a barrier surrounding an upper portion of said elongated member and being configured to reduce flow of the water runoff and/or absorb a portion of the contaminant(s) prior to the water runoff entering said hollow interior of said elongated member.

14. The water runoff treatment apparatus of claim 13, wherein said barrier comprises living plants capable of at least one of phytoremediation, bioremediation and filtration.

15. The water runoff treatment apparatus of claim 14, wherein said barrier further comprises a membrane containing roots of said living plant(s).

16. A storm water runoff treatment apparatus, comprising:
(a) an elongated member positioned vertically, during use of said apparatus, within a vertical well provided in a soil structure, said elongated member comprising:
  i. a hollow interior;
  ii. a first open end positioned above ground level,
  iii. a second open end positioned within an interior soil layer of said soil structure and sized and shaped to expel treated storm water runoff therefrom, and
  iv. at least one opening formed through a wall thickness of said elongated member in a portion thereof extending above ground level and in an open communication with said hollow interior;
(b) a filtering component positioned to cover said at least one opening, wherein said filtering component operates to separate contaminant(s) from the storm water runoff prior to a passage of the storm water runoff through said at least one opening into said hollow interior of said elongated member; and
(c) a membrane comprising:
  i. a first exterior surface of said membrane positioned above and in contact with a surface of an upper layer of a soil structure,
  ii. a second exterior surface spaced apart from said first exterior surface to define a thickness of said membrane, said second exterior surface being exposed during use of said apparatus to receive the storm water runoff thereon,
  iii. one or of more layers within said thickness, and
  iv. and an aperture formed through said thickness of said membrane, said aperture sized and shaped to pass said elongated member therethrough.

17. The apparatus of claim 16, further comprising a trash rack positioned to surround an upper portion of said elongated member, said trash rack comprising a bottom wall, a peripheral side wall upstanding on said bottom wall and openings formed through a thickness of said peripheral side wall.

18. The water runoff treatment apparatus of claim 16, further comprising:
at least one opening formed through a wall thickness of said elongated member in an upper portion thereof extending above the ground level and in an open communication with said hollow interior; and
a filtering component positioned to cover said at least one opening, wherein said filtering component operates to separate oil and grease from the water runoff prior to a passage of the water runoff into said hollow interior of said elongated member.

19. The water runoff treatment apparatus of claim 16, further comprising:
opening(s) formed through a wall thickness of said elongated member in an upper portion thereof extending above the ground level and in an open communication with said hollow interior; and
filtration member(s) mountable, stationary or for a linear reciprocal movement on an exterior surface of said member due to levels of the storm water runoff, to cover said opening(s) during use of said apparatus, said filtration member(s) being configured and operable to at least separate contaminant(s) from the storm water runoff prior to discharging the filtered water runoff through said opening(s) into said hollow interior of said elongated member.

20. The water runoff treatment apparatus of claim 16, further comprising living plants and a plant membrane placed on top of said membrane during use of said apparatus, said plant membrane containing roots of said living plants.

* * * * *